April 1, 1958 — C. AZEMA — 2,829,301
TRAVELLING WAVE-TUBE
Filed Jan. 12, 1955 — 3 Sheets-Sheet 1

INVENTOR
Charles Azéma
BY
AGENT

April 1, 1958    C. AZEMA    2,829,301
TRAVELLING WAVE-TUBE
Filed Jan. 12, 1955    3 Sheets-Sheet 3

INVENTOR
Charles Azema
BY
AGENT

United States Patent Office 2,829,301
Patented Apr. 1, 1958

2,829,301
TRAVELLING WAVE-TUBE

Charles Azéma, Brive, France, assignor, by mesne assignments, to North American Philips Company, Inc., New York, N. Y., a corporation of Delaware Application January 12, 1955, Serial No. 481,404

Claims priority, application France January 12, 1954

9 Claims. (Cl. 315—3.6)

This invention relates to devices comprising travelling-wave amplifying tubes, that is to say tubes in which an electron beam moves in or along a retardation or delay line and an electro-magnetic wave on the retardation line interacts with electrons in the beam. The invention also relates to amplifying tubes intended for use in such devices.

The amplification of travelling-wave tubes is limited by several factors, the most important of which is the occurrence of an electro-magnetic wave which moves in the opposite direction to the wave to be amplified as a result of reflection at the output of the tube. The returning wave has two disadvantages. In the first place the returning wave can reach the input circuit comparatively easily, since the coupling of the tube with the input circuit is usually made free from reflection in order to decrease the input loss. In the second place the returning wave may lead to self-oscillation. A travelling-wave amplifying tube having a gain factor of A db and a reflection of $r'$ db at the output and a reflection of $r$ db at the input starts to oscillate if $$A + r + r' > 0$$

and if the returning wave is sufficiently shifted in phase with respect to the wave to be amplified or forward wave. In order to ensure maximum amplification, a damping or attenuation of $x$ db is usually provided along the retardation line, so that the above-mentioned expression changes to $$A + r + r' - 2x > 0$$

Such a damping in many cases consists of a graphite layer provided in the vicinity of the electron beam. Such an arrangement has the disadvantage that the ultimate amplification of the tube, instead of being equal to A db, is equal to $A - x$ db. In the foregoing discussion, the symbols A, $r$, $r'$ and $x$ are gain, reflection and attenuation factors, respectively, of a conventional travelling wave tube.

The object of the invention is to provide a device in which the returning wave is attenuated to a greater extent than the forward wave to be amplified, so that a higher amplification is possible without oscillation occurring.

According to the invention, in a device comprising a traveling-wave amplifying tube, the retardation line is interrupted by the sequence of a selective attenuator, of which the directions of maximum and minimum electrical field strength transmissibility are at right angles to one another, and a wave guide which produces a non-reciprocal or irreversible rotation of 45° of the direction of the electrical field vector of a transverse electrical wave, whereas the parts of the retardation line located between said non-reciprocal rotator and the output of the tube do not bring about any further non-reciprocal rotation of the direction of the electrical field vector.

This arrangement ensures that as a result of the irreversible rotation in the intermediate wave guide, the returning or reflected wave reaches the selective attenuator with a direction of the electrical field vector shifted by 90° with respect to the wave initially passed, the returning wave thus being strongly damped by the selective attenuator. The part of the returning wave still passed by the selective attenuator is thus considerably smaller than if the forward and returning waves were damped to the same extent. Consequently, the part of this wave which can reach the input circuit of the tube is considerably smaller than that in known devices. The part reflected at the input is led with the same direction of the electrical field vector through the selective attenuator and again damped therein, and passes subsequently through the wave guide rotator causing irreversible rotation of the electrical field vector in the same direction, but with a direction of the electrical field vector rotated by 135° with respect to the initial plane of polarisation of the incoming wave.

In order to ensure the optimum effect of the device according to the invention, the wave guide bringing about the irreversible rotation of the electrical field strength is followed by another selective attenuator of which the maximum direction of passage is matched to the direction of the electrical field vector which the wave to be amplified exhibits after being subjected for the first time to the irreversible rotation. The input and the output of the tube are preferably connected to rectangular wave guides of which the direction of the electrical field vector of the $TE_{10}$ mode corresponds to the maximum direction of passage of the adjacent selective attenuators, since the returning wave is first reflected at the output, subsequently reflected at the boundary of a first selective attenuator and the input retardation line and then at the boundary of a second selective attenuator and the output retardation line to return thereafter completely to the input after having been damped four times by the selective attenuators. As an alternative, it is possible for a plurality of the said combinations comprising two selective attenuators, together with intermediate wave guides causing irreversible rotation, to be arranged between the input and the output of the travelling-wave tube. In a device having only a sequence of two selective attenuators, together with an intermediate wave guide causing irreversible rotation, and a damping of $\beta$ db for each selective attenuator in the minimum direction of passage, the damping of the wave returning to the input of the tube is $4\beta$ db. This implies that the device according to the invention can have an amplification which is $2\beta$ db higher than if the said steps were not taken.

In order that the invention may be readily carried into effect, it will now be described, by way of example, with reference to the accompanying drawing in which.

Figure 1:
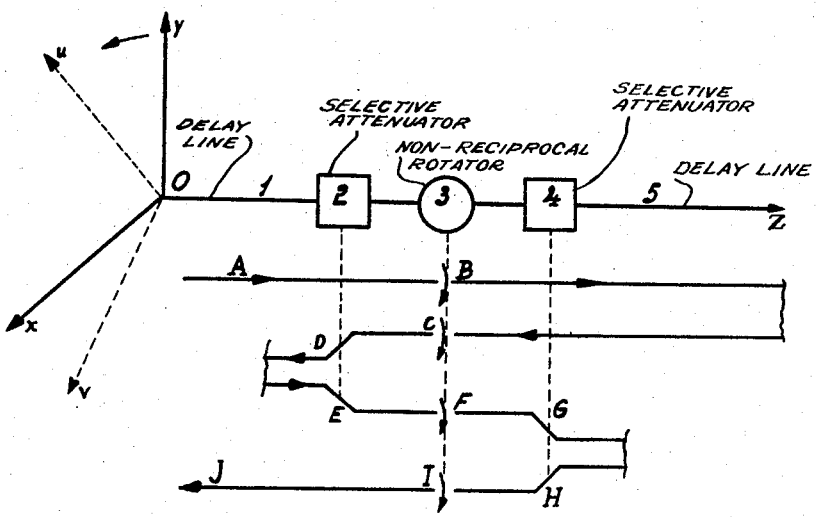
Figs. 1 and 2 show diagrams to explain the operation.
Figure 2:
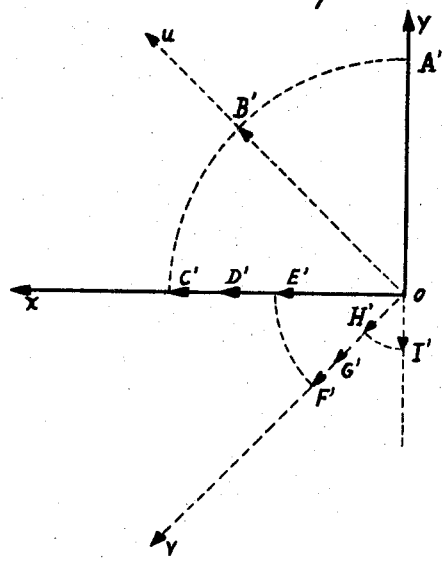

Referring now to Fig. 1, X—O—Y—Z indicates a left-hand orthogonal system of axes. Along the Z-axis extends a retardation or delay line comprising parts 1 and 5 and between them two selective attenuators 2 and 4 and a wave guide 3 causing irreversible or non-reciprocal rotation of the electrical field strength or plane of polarization of a travelling wave. Furthermore, O—U and O—V, respectively, indicate the bisectrices of the angle X—O—Y above and below the X—Z plane. The wave to be amplified with the electrical field strength vector in the direction O—Y is introduced into the retardation line 1 and passes, after being amplified, through the selective attenuator 2, of which the maximum and minimum directions of passage correspond to O—Y and O—X. The device 3 rotates the direction of the electrical field strength i. e., the plane of polarization, by 45° from Y to X. The maximum and minimum directions of passage of attenuator 4 correspond to O—U and O—V. The direction of the electrical field strength vector of the amplified wave in the retardation line 5 corresponds to O—U. The retardation lines 1 and 5 are constituted by rectangular wave guides with the longer sides of the cross-sections at right angles to the electrical field strength vector, so that they oscillate in the $TE_{10}$-mode. The two attenuators and the rotation devices comprise a wave guide of circular cross-section which oscillates in the $TE_{11}$-mode. The outline of the wave is shown diagrammatically in Fig. 1 and indicated by A to J inclusive. The incoming wave at 1 is indicated by A. It passes through 2 without attenuation and its polarization plane is rotated by 45° in 3 to form wave B. This wave is passed by 4 without attenuation and reflected at the output of the tube. The reflected wave is again passed by 4 without attenuation and again rotated in the same sense by 45° in 3 as a wave C and passed without attenuation. This wave is now attenuated in 2 to form wave D and reflected at the transition between 1 and 2. Subsequently, the wave is again attenuated by 2 to form wave E, again rotated by 45° in 3 to form wave F, attenuated in 4 to form wave G, reflected at the transition between 4 and 5, again attenuated in 4 to form wave H, rotated by 45° in 3 to form wave I, and finally as a wave J passed in 1 without being attenuated by 2. The last-mentioned wave only can contribute to self-oscillation of the tube. Fig. 2 shows the variation in the direction of the electrical field strength vector and the way in which the intensity decreases upon passage through the various parts of the device. The vectors are indicated by A' to I' inclusive. In the foregoing considerations any coefficients of reflection at the transitions 4, 5 and 1, 2 have not been taken into account for the sake of simplicity and this has neither been done for the coefficient of reflection at the output of the tube. The irreversible rotator may contain substances which exhibit rotational capacity or electric double refraction, so-called Kerr-effect, under the action of electric or magnetic fields.

Figure 3:
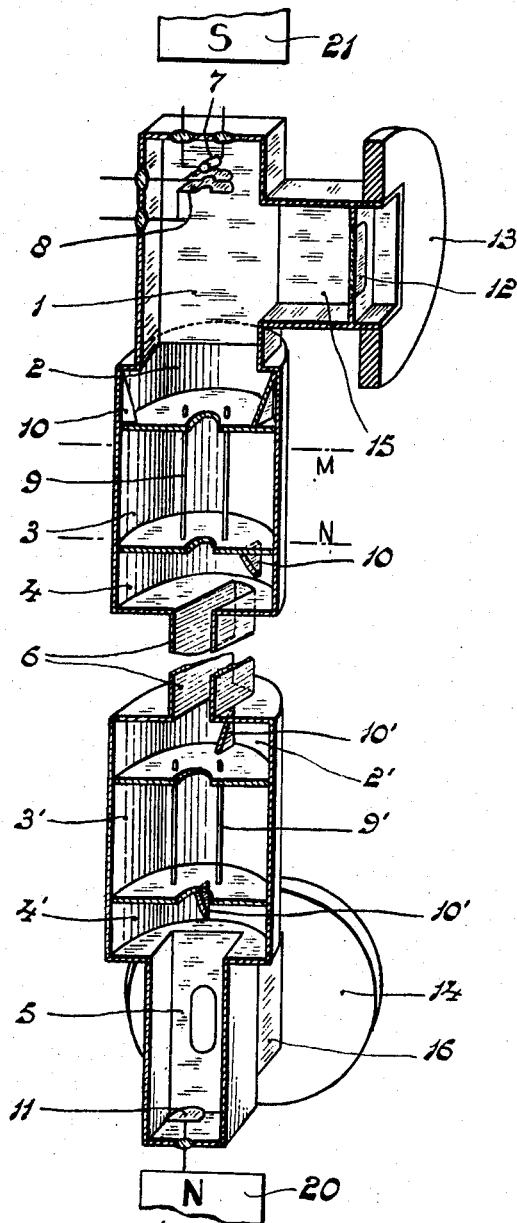
Fig. 3 shows diagrammatically a tube for use in a device according to the invention and Figs. 4A and 4B to 7A and 7B inclusive show several modifications of the portion of the tube of Fig. 3 between the lines M—N thereof.

In Fig. 3, the input and output parts of the travelling-wave tube comprise rectangular wave guides 1 and 5 which oscillate in the $TE_{10}$ mode. The tube comprises a double set of selective attenuators 2, 4 and 2', 4' and intermediate irreversible rotation devices 3 and 3'. The first combination 2, 3, 4 comprises a wave guide of circular cross-section coupled to the wave guide 1 and a wave guide 6, which represents the output for said first combination. This is followed by the second section or set of selective attenuators and the intermediate irreversible rotation device 2', 3', 4' and which is connected to the wave guide 5. Each of the irreversible rotation devices 3 and 3' rotates the electrical field strength by 45°, so that the longer sides of the wave guides 1, 6 and 5 are relatively turned through an angle of 45°. The cathode for providing the electron beam which passes through the wave-guide is indicated by 7 and two concentrating and accelerating electrodes are indicated by 8. The coupling with the input circuit and the output circuit is a so-called T-coupling comprising wave guides 15 and 16 having flanges 13 and 14, respectively, in which a wave-transparent, but vacuum-tight, window 12 is provided. 11 indicates the collector for the electron beam. The retardation lines comprising the parts 1, 6 and 5 are shown only diagrammatically as rectangular wave guides, but they are equipped, for example, in known manner with a plurality of partitions in order to make the wave guides suitable as retardation or delay lines. The selective attenuators 2, 4 and 2', 4', comprise laminated sheets of resistance material which gradually increase in size and which are parallel to the longer sides of the adjacent wave guides. The laminated sheets are indicated by 10 and it is to be noted that the laminated sheets of the attenuator 4 are rotated by 45° with respect to those of attenuator 2. In the example shown in Fig. 3 the wave guide 3 causing an irreversible rotation of the magnetic field comprises a plurality of ferrite rods 9 mounted parallel to the axis. The ferrite rods, which consist of mixtures of iron oxides and oxides of bivalent metals, have small high-frequency losses in the tube concerned but under the action of an axially directed magnetic field, provided, for example, by pole pieces 20, 21 of suitable magnetic field producing means, they cause an irreversible rotation of the electric field strength vector of the transverse linearly-polarized field, that is to say this rotation is independent of the direction of propagation of the wave. The device 3' is similar to the device 3. The axial magnetic field may also serve to concentrate the electron beam between the electrodes 8 and the collector 11.

Figure 4A:
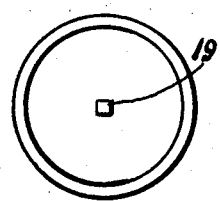
Figure 4B:
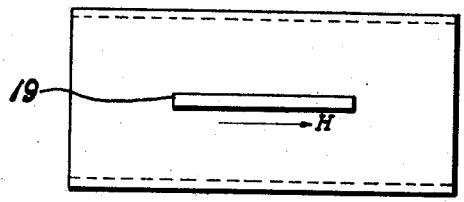
Figure 5A:
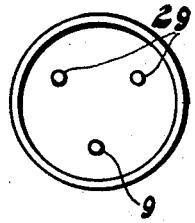
Figure 5B:
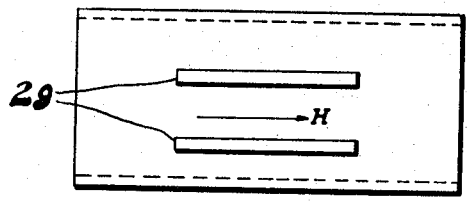

Figs. 4A and 4B to 7A and 7B respectively illustrate several different ways in which the ferrite rods may be mounted within the tube of Fig. 3 in the irreversible rotators 3, 3', i. e., between the lines M—N in the figure. Figs. 4A and 4B show, respectively, cross-sectional and side views of the irreversible rotators 3, 3', wherein only one rectilinear ferrite rod 19 is arranged in the axis of the wave guide instead of two rods as shown in Fig. 3 or three rods 29, as shown in Figs. 5A and 5B. It will be evident that in the former case a hollow electron beam is to be used. The arrow indicated by H indicates the direction of the magnetic field necessary to effect the irreversible rotation.

Figure 6A:
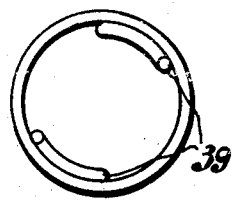
Figure 6B:
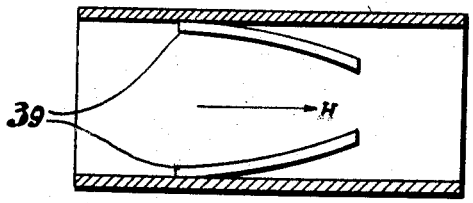

As an alternative, it is possible to arrange the ferrite rods in the vicinity of the wall of the wave guide in such manner that the electrical field strength at this area is a minimum and the high-frequency loss, which is already small, thus has a minimum influence. This is shown in Figs. 6A and 6B. The rods 39 are arranged helically in the wave guide with such a pitch as corresponds to a length of the wave guide at which the direction of the electric field strength would be rotated by 360°. In the afore-mentioned arrangement allowance has to be made for the fact that the ferrite rods also bring about a reversible rotation of the electric field strength regardless of the presence of the magnetic field.

Figure 7A:
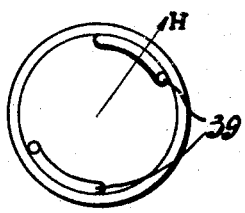
Figure 7B:
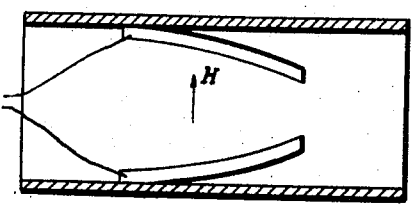

In Figs. 7A and 7B, as before, two ferrite rods are arranged helically in the wave guide, but in this example the magnetic field H is directed at right angles to the axis of the wave guide.

It is alternatively possible to arrange a dielectric body of a shape exhibiting rotational symmetry inside the wave guide and to produce an electric field at right angles to the axis of the wave guide at an angle of 22.5° with the direction of the incident electric field, the rotation of the electrical field vector being obtained by electric double refraction. In this case also it is to be considered that a reversible electrical double refraction occurs in the absence of the electric field.

The device described above may also include auxiliary wave guides so far as they do not bring about additional reflections. The selective attenuators may alternatively comprise wave guides having either grids at right angles to the axis or suitably slotted partitions at right angles to the axis. The described device is suitable more particularly as a frequency multiplier due to the fact that matching of the load is not required. The output circuit in this case is a wave guide having a cut-off frequency which is considerably higher than the fundamental frequency.

What is claimed is:

1. An electrical device of the travelling-wave type comprising a retardation line capable of carrying wave energy, input means to said line for introducing wave energy of the transverse electric type having a given plane of polarization, means in said line for passing substantially all wave energy having said given plane and for attenuating wave energy having planes of polarization other than said given plane, means in said line following said attenuating means for non-reciprocally rotating the plane of polarization of wave energy passing therethrough, output means for abstracting wave energy from said line, the portions of said line between the output means and the rotating means being incapable of providing rotation of the plane of polarization of reflected waves, and beam producing and directing means for producing and directing a beam of charged particles through said line to cause interaction between the charged particles and the wave energy on said line.

2. An electrical device as set forth in claim 1 wherein the retardation line comprises a rectangular wave guide, and the attenuating means comprises a circular wave guide having resistance means mounted therein to effect the desired attenuation.

3. An electrical device as set forth in claim 2 wherein the resistance means comprise laminated sheets of resistance material extending parallel to the longer sides of the adjacent rectangular wave guide.

4. An electrical device as set forth in claim 1 wherein the rotating means comprises a circular wave guide and at least one ferrite rod mounted within said guide.

5. An electrical device of the travelling-wave type comprising a retardation line capable of carrying wave energy, input means to said line for introducing wave energy of the transverse electric type having a given plane of polarization, first means in said line for passing substantially all wave energy having said given plane and for attenuating wave energy having planes of polarization other than said given plane, said first means providing maximum attenuation for waves having a plane of polarization at right angles to said given plane, second means in said line following said attenuating means for non-reciprocally rotating by 45° the plane of polarization of wave energy passing therethrough, so that the output wave therefrom has a plane of polarization rotated by 45° relative to the input wave, third means in said line following said second means for passing substantially all wave energy having planes corresponding to the output wave from the second means and attenuating wave energy in other planes, output means for abstracting wave energy from said line, the portions of said line between the output means and the rotating means being incapable of providing rotation of the plane of polarization of reflected waves, and beam producing and directing means for producing and directing a beam of electrons through said line to cause interaction between the electrons and the wave energy on said line.

6. A device as set forth in claim 5 wherein the rotating means comprises a plurality of ferrite rods, and means are provided for producing a magnetic field in the same direction as said electron beam to excite said ferrite rods.

7. A device as set forth in claim 6 wherein the rods are helical in shape and are mounted within said rotating means at an area where the electric field strength of the wave energy is at a minimum.

8. A device as set forth in claim 5 wherein the rotating means comprises a plurality of helical ferrite rods mounted in a transverse magnetic field.

9. A device as set forth in claim 8 wherein the rotating means comprises a rotational-symmetrical dielectric member mounted in an electric field at an angle of 22.5° to the plane of polarization of the incident wave energy.

References Cited in the file of this patent
UNITED STATES PATENTS 2,367,295    Llewellyn _____ Jan. 16, 1945
2,644,930    Luhrs _____ July 7, 1953